(12) United States Patent
Suciu et al.

(10) Patent No.: US 7,934,902 B2
(45) Date of Patent: May 3, 2011

(54) COMPRESSOR VARIABLE STAGE REMOTE ACTUATION FOR TURBINE ENGINE

(75) Inventors: Gabriel L. Suciu, Glastonbury, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1020 days.

(21) Appl. No.: 11/719,594

(22) PCT Filed: Dec. 1, 2004

(86) PCT No.: PCT/US2004/039974
§ 371 (c)(1),
(2), (4) Date: May 17, 2007

(87) PCT Pub. No.: WO2006/059972
PCT Pub. Date: Jun. 8, 2006

(65) Prior Publication Data
US 2009/0155057 A1    Jun. 18, 2009

(51) Int. Cl.
*F01D 17/12*    (2006.01)
(52) U.S. Cl. ........................................ 415/150; 415/160
(58) Field of Classification Search .................. 415/148, 415/150, 159, 160, 161
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |
| 2,874,926 A | 2/1959 | Gaubatz | |
| 2,989,848 A | 6/1961 | Paiement | |
| 3,009,630 A | 11/1961 | Busquet | |
| 3,037,742 A | 6/1962 | Dent et al. | |
| 3,042,349 A | 7/1962 | Pirtle et al. | |
| 3,060,680 A * | 10/1962 | Wilde et al. | ........... 60/226.3 |
| 3,081,597 A | 3/1963 | Kosin et al. | |
| 3,132,842 A | 5/1964 | Tharp | |
| 3,204,401 A | 9/1965 | Serriades | |
| 3,216,455 A | 11/1965 | Cornell et al. | |
| 3,267,667 A | 8/1966 | Erwin | |
| 3,269,120 A | 8/1966 | Sabatiuk | |

(Continued)

FOREIGN PATENT DOCUMENTS

DE             767704         5/1953

(Continued)

*Primary Examiner* — Edward Look
*Assistant Examiner* — Ryan H Ellis
(74) *Attorney, Agent, or Firm* — Carlson, Gaskey & Olds, P.C.

(57) ABSTRACT

A turbine engine locates an actuator (55) for the compressor variable guide vanes (54a, b, c) at a location remote from the variable guide vanes. The actuator is connected to the variable guide vanes through a torque rod (56) inside an inlet guide vane. The torque rod rotatably drives an activation ring (57) about the engine centerline. The activation ring is coupled to each of the variable compressor vanes via linkage, such that rotation of the activation ring about the engine centerline causes all of the variable compressor vanes to pivot. With this configuration, a tip turbine engine can be more easily provided with variable compressor vanes for the axial compressor.

23 Claims, 2 Drawing Sheets

U.S. PATENT DOCUMENTS

| | | | |
|---|---|---|---|
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,275,560 A * | 6/1981 | Wright et al. | 60/226.3 |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Liston et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,619,916 B1 * | 9/2003 | Capozzi et al. | 415/160 |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 * | 2/2004 | Paul | 60/39.43 |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |
| WO | 2006/059968 | 6/2006 |
| WO | 2006/059969 | 6/2006 |
| WO | 2006/059972 | 6/2006 |
| WO | 2006/059973 | 6/2006 |
| WO | 2006/059974 | 6/2006 |
| WO | 2006/059975 | 6/2006 |

| | | | | | | |
|---|---|---|---|---|---|---|
| WO | 2006/059976 | 6/2006 | | WO | 2006/060004 | 6/2006 |
| WO | 2006/059977 | 6/2006 | | WO | 2006/060005 | 6/2006 |
| WO | 2006/059978 | 6/2006 | | WO | 2006/060006 | 6/2006 |
| WO | 2006/059979 | 6/2006 | | WO | 2006/060009 | 6/2006 |
| WO | 2006/059980 | 6/2006 | | WO | 2006/060010 | 6/2006 |
| WO | 2006/059981 | 6/2006 | | WO | 2006/060011 | 6/2006 |
| WO | 2006/059982 | 6/2006 | | WO | 2006/060012 | 6/2006 |
| WO | 2006/059985 | 6/2006 | | WO | 2006/060013 | 6/2006 |
| WO | 2006/059986 | 6/2006 | | WO | 2006/060014 | 6/2006 |
| WO | 2006/059987 | 6/2006 | | WO | 2006/062497 | 6/2006 |
| WO | 2006/059988 | 6/2006 | | WO | 2006059980 | 6/2006 |
| WO | 2006/059989 | 6/2006 | | WO | 2006059990 | 6/2006 |
| WO | 2006/059990 | 6/2006 | | WO | 2006060003 | 6/2006 |
| WO | 2006/059991 | 6/2006 | | WO | 2006/059971 | 8/2006 |
| WO | 2006/059992 | 6/2006 | | WO | 2006/059970 | 10/2006 |
| WO | 2006/059993 | 6/2006 | | WO | 2006/110122 | 10/2006 |
| WO | 2006/059994 | 6/2006 | | WO | 2006/059997 | 11/2006 |
| WO | 2006/059995 | 6/2006 | | WO | 2006/110124 | 11/2006 |
| WO | 2006/059996 | 6/2006 | | WO | 2006/110123 | 12/2006 |
| WO | 2006/059999 | 6/2006 | | WO | 2006/112807 | 12/2006 |
| WO | 2006/060000 | 6/2006 | | WO | 2006/110125 | 2/2007 |
| WO | 2006/060001 | 6/2006 | | WO | 2006/060003 | 3/2007 |
| WO | 2006/060002 | 6/2006 | | | | |

\* cited by examiner

COMPRESSOR VARIABLE STAGE REMOTE ACTUATION FOR TURBINE ENGINE

This invention was conceived in performance of U.S. Air Force contract F33657-03-C-2044. The government may have rights in this invention.

BACKGROUND OF THE INVENTION

The present invention relates to turbine engines, and more particularly to a remote actuator for a variable stage of a compressor for a turbine engine, such as a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the hollow fan blades operate as a high pressure centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

Conventional turbine engines and tip turbine engines may include a low pressure compressor upstream of the high pressure compressor. Conventional gas turbine engines include variable guide vanes at the inlet to the high pressure compressor. Actuators for the variable guide vanes are located on the compressor case. In the tip turbine engine, however, the compressor case has a small radial thickness because it is located radially inward of the bypass airflow path. Packaging the actuator for variable compressor vanes on the compressor case would be difficult or would require increasing the diameter of the splitter, which would thereby encroach on the bypass airflow path.

SUMMARY OF THE INVENTION

A turbine engine according to the present invention locates an actuator for the compressor variable guide vanes at a location remote from the variable guide vanes. The actuator is connected to the variable guide vanes through a torque rod inside an inlet guide vane. The torque rod rotatably drives an activation ring about the engine centerline. The activation ring is coupled to each of the variable compressor vanes via levers, such that rotation of the activation ring about the engine centerline causes all of the variable compressor vanes to pivot.

As a result, the tip turbine engine can be more easily provided with variable compressor vanes for the axial compressor. This configuration also allows easy access to the actuators and plumbing for servicing. The present invention could also be used in conventional gas turbine engines.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
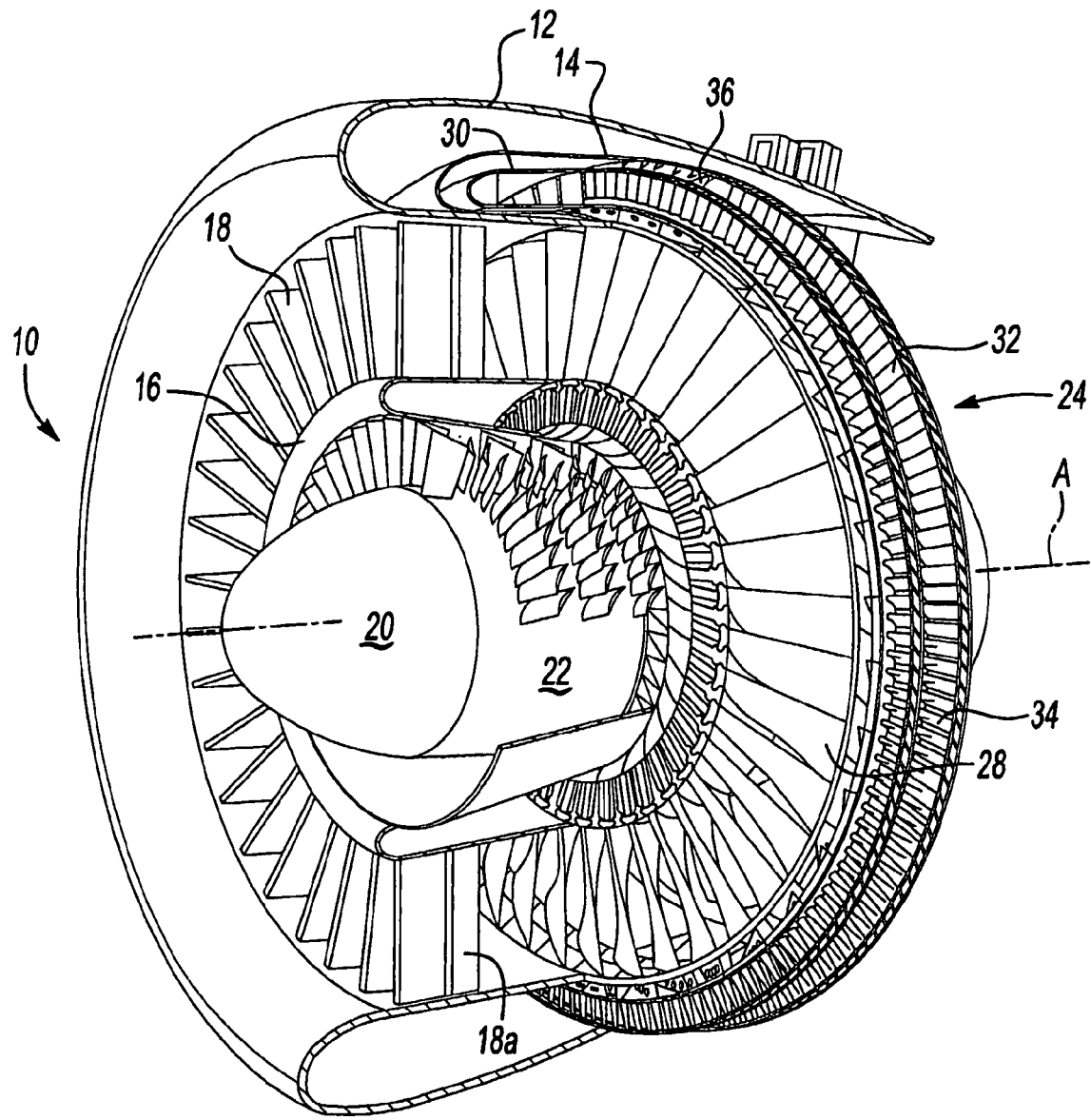
FIG. 1 is a partial sectional perspective view of a tip turbine engine.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
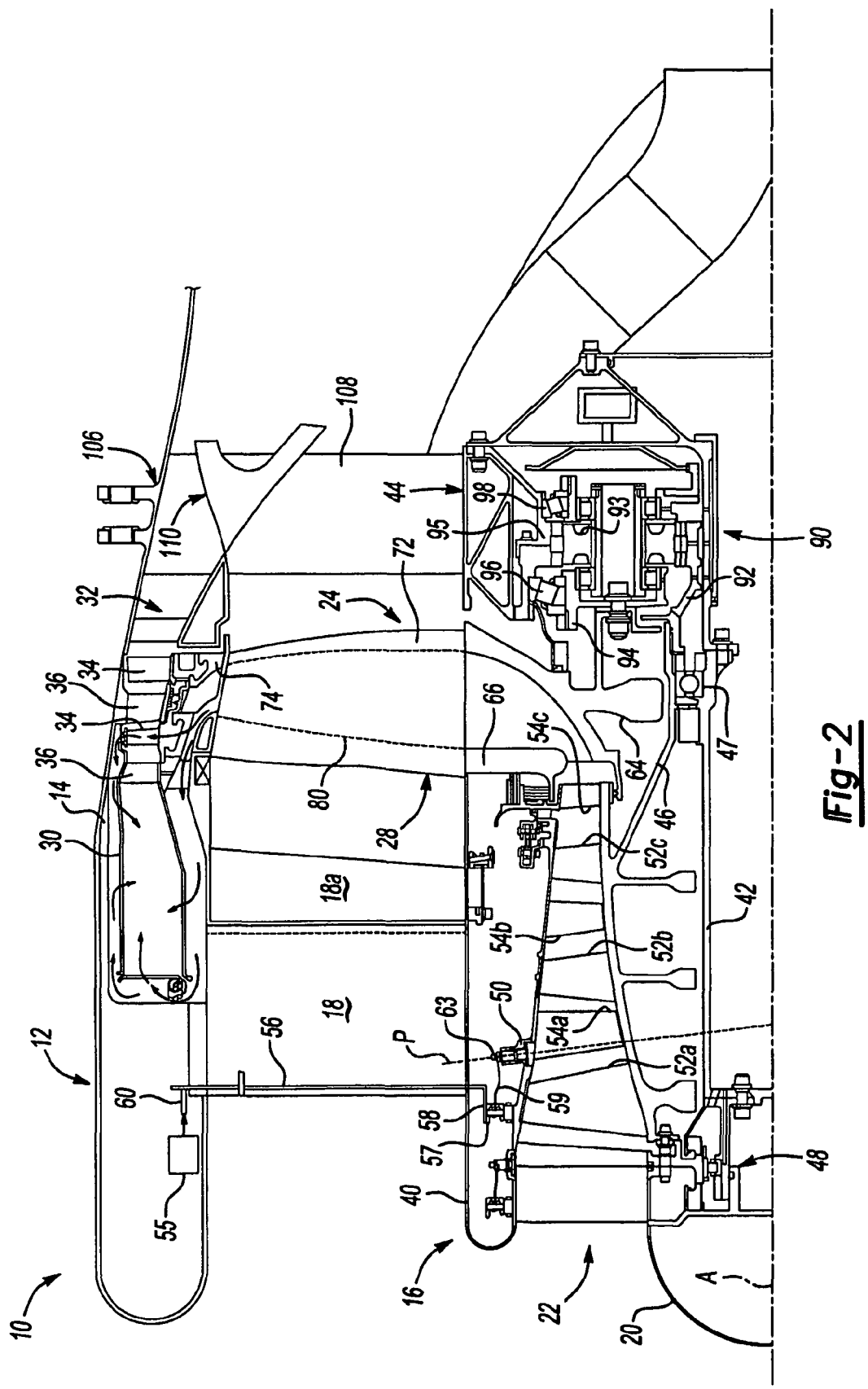
FIG. 2 is a longitudinal sectional view of the tip turbine engine of FIG. 1 along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, which is mounted for rotation upon the static inner support housing 42 through an aft bearing assembly 47 and a forward bearing assembly 48. A plurality of stages of compressor blades 52a-c extend radially outwardly from the axial compressor rotor 46. A fixed compressor case 50 is mounted within the splitter 40. A plurality of compressor vanes 54a-c extend radially inwardly from the compressor case 50 between stages of the compressor blades 52a-c. The compressor blades 52a-c and compressor vanes 54a-c are arranged circumferentially about the axial compressor rotor 46 in stages (three stages of compressor blades 52a-c and compressor vanes 54a-c are shown in this example). As will be further explained, the first compressor vane 54a is variable, i.e. it is selectively pivotable about an axis P that is transverse to the engine centerline. In the example shown, the axis P is approximately perpendicular, but tilted slightly to accommodate the narrowing core airflow path of the axial compressor 22. The other compressor vanes 54b-c could optionally be variable as well, either dependently or independently of the first compressor vane 54a.

The rotational position of the compressor vane 54a is controlled by an actuator 55 that is mounted remotely from the compressor vane 54a and remotely from the axial compressor 22. The actuator 55 may be hydraulic, electric or any other type of suitable actuator. In the embodiment shown, the actuator 55 is located within the nacelle 12, radially outward of the bypass airflow path. The compressor vane 54a is operatively connected to the compressor vane 54a via a torque rod 56 that is routed through one of the inlet guide vanes 18. Within the splitter 40, the torque rod 56 is coupled to an activation ring 57 via a torque rod lever 58. The activation ring 57 is rotatable about the engine centerline A. The activation ring 57 is in turn coupled to a shaft 63 of the variable guide vane 54a via an activation lever 59. The plurality of variable guide vanes 54a (only one shown) are disposed circumferentially about the engine centerline A, and each is connected to the activation ring 57 in the same manner. The actuator 55 is coupled to the torque rod 56 by an actuator lever 60. As will be noted, the actuator 55 is spaced away from the variable guide vane 54a in a direction having a component generally parallel to the pivot axis P and by a distance that is substantially greater than a vane height of the variable guide vane 54a as measured along the pivot axis P.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again toward an axial airflow direction toward the annular combustor 30. Preferably, the airflow is diffused axially forward in the engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 is an epicyclic gearbox, such as the planetary gearbox shown, that is mounted for rotation between the static inner support housing 42 and the static outer support housing 44. The gearbox assembly 90 includes a sun gear 92, which rotates the axial compressor 22, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed.

In operation, the actuator 55 selectively moves the end of the actuator lever 60 to cause the torque rod 56 to pivot on its longitudinal axis within the inlet guide vane 18. This causes rotation of the activation ring 57 about the engine centerline A, which in turn causes each of the activation levers 59 to pivot and cause rotation of the corresponding compressor vane 54a about its axis P to a selected angle. The selected angle of the compressor vane 54a adjusts the core airflow entering the axial compressor 22, where it is compressed by the compressor blades 52a-c. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in an exhaust case 106.

A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

In the present invention, because the actuator 55 is located remotely from the variable compressor vanes 54a, the size of the splitter 40 and compressor case 50 can be minimized. Routing the linkage between the actuator 55 and the compressor vane 54a within the interiors of the nacelle 12, inlet guide vane 18 and splitter 40 does not require any additional space and provides easy access to the various components for service.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, there are many configurations of linkages, rigid and/or flexible, that could be used to connect the remote actuator 55 to the compressor vane 54a. Also, although the remote actuator 55 has been shown in connection with a tip turbine engine 10, it could also be used in conventional or other turbine engines.

The invention claimed is:

1. A turbine engine comprising:
a compressor case including a plurality of vanes disposed about a longitudinal axis of the compressor case, at least one of the vanes pivotable about a pivot axis, a bypass air flow path disposed radially outwardly of the compressor case;
an actuator disposed radially outward of at least a portion of the bypass air flow path, the actuator mechanically coupled to the at least one vane to selectively pivot the at least one vane about the pivot axis, and
an inlet guide vane radially outward of the compressor case.

2. The turbine engine of claim 1 further including:
the inlet guide vane extending between a static outer structure and a static inner structure; and
a linkage disposed within the inlet guide vane, the linkage mechanically coupling the actuator to the at least one of the vanes.

3. The turbine engine of claim 2 wherein the linkage includes a ring disposed about a longitudinal axis of the compressor case, rotation of the ring about the axis of the compressor case selectively pivoting the at least one of the vanes about the pivot axis.

4. The turbine engine of claim 3 wherein the linkage further includes a lever coupled between the ring and a shaft on the pivot axis of the at least one vane.

5. The turbine engine of claim 1 further including a fan rotatable about an axis coaxial with the longitudinal axis of the compressor case, the fan generating a bypass airflow through the bypass air flow path.

6. The turbine engine of claim 5 wherein the actuator is disposed radially outward of all of the bypass airflow.

7. The turbine engine of claim 5 wherein the fan is disposed axially aft of the compressor case.

8. The turbine engine of claim 5 further including:
an inlet guide vane extending between a static outer structure and a static inner structure; and
a linkage disposed within the inlet guide vane, the linkage mechanically coupling the actuator to the at least one of the vanes.

9. The turbine engine of claim 8 wherein the linkage includes a ring disposed about the axis of the compressor case, rotation of the ring about the axis selectively pivoting the at least one vane about the pivot axis.

10. The turbine engine of claim 9 wherein the linkage further includes a lever coupled between the ring and a shaft on the pivot axis of the at least one vane.

11. The turbine engine of claim 1, wherein the inlet guide vane includes a variable trailing edge.

12. The turbine engine of claim 1, wherein each of the plurality of vanes is pivotable about the pivot axis.

13. The turbine engine of claim 1, further including an inducer section downstream of the compressor case, wherein the inducer section turns airflow from an axial direction to a radial direction.

14. The turbine engine of claim 1, wherein each of the plurality of vanes is independently pivotable.

15. The turbine engine of claim 1, wherein the turbine engine includes a compressor, a fan blade, and a turbine rotor.

16. A compressor vane assembly for an axial compressor of a turbine engine comprising:
a compressor vane pivotable about a pivot axis;
an actuator for selectively pivoting the vane about the pivot axis, the actuator spaced away from the vane in a direction having a component generally parallel to the pivot axis; and
a linkage operatively connecting the actuator to the vane, wherein the linkage is disposed within an inlet guide vane radially outward of the compressor vane.

17. The compressor vane assembly of claim 16 wherein the actuator is spaced from the vane by a distance that is substantially greater than a vane height of the vane as measured along the pivot axis.

18. The compressor vane assembly of claim 16 wherein the actuator is radially outward of a bypass airflow path and the vane is radially inward of the bypass airflow path.

19. The compressor vane assembly of claim 16 wherein the linkage includes an elongated rigid connector.

20. The compressor vane assembly of claim 16 wherein the linkage includes a torque rod transmitting motion rotatably about a major axis of the torque rod.

21. The compressor vane assembly of claim 16 wherein the linkage includes a ring disposed about a ring axis generally transverse to the pivot axis of the vane, rotation of the ring about the ring axis causing pivoting of the vane.

22. A method for actuating a variable guide vane on a compressor, the method including the steps of:
generating an actuation force at a remote location from a variable guide vane having a pivot axis;
transmitting the actuation force to the pivot axis through linkage within an inlet guide vane, wherein the inlet guide vane is radially outward of the variable guide vane; and
selectively pivoting the guide vane about the pivot axis with the transmitted actuation force.

23. The method of claim 22 wherein the guide vane is one of a plurality of guide vanes disposed circumferentially about a compressor axis, each having a different said pivot axis generally transverse to a longitudinal axis of the compressor, the method further including the steps of:
rotating a ring about the compressor axis with the transmitted actuation force; and
pivoting the plurality of guide vanes about their respective pivot axes by rotation of the ring.

* * * * *